(12) United States Patent
Barnett et al.

(10) Patent No.: US 7,382,560 B2
(45) Date of Patent: Jun. 3, 2008

(54) LOW POWER SERVO MODE WRITE DRIVER

(75) Inventors: Raymond Elijah Barnett, W. Apple Valley, MN (US); Tuan Van Ngo, Eden Prairie, MN (US); Scott Gary Sorenson, Lakeville, MN (US)

(73) Assignee: Texas Instruments Incorporated, Dallas, TX (US)

( * ) Notice: Subject to any disclaimer, the term of this patent is extended or adjusted under 35 U.S.C. 154(b) by 524 days.

(21) Appl. No.: 10/249,665

(22) Filed: Apr. 29, 2003

(65) Prior Publication Data
US 2004/0218301 A1    Nov. 4, 2004

(51) Int. Cl.
*G11B 5/09* (2006.01)

(52) U.S. Cl. .......................................... 360/46; 360/48
(58) Field of Classification Search .................. 360/46, 360/66, 68, 67; 327/108, 110
See application file for complete search history.

(56) References Cited

U.S. PATENT DOCUMENTS

| | | | | |
|---|---|---|---|---|
| 4,157,574 A | * | 6/1979 | Stamer | 360/66 |
| 5,687,036 A | * | 11/1997 | Kassab | 360/53 |
| 5,856,891 A | * | 1/1999 | Ngo | 360/66 |
| 6,104,562 A | * | 8/2000 | Ottesen et al. | 360/63 |
| 6,118,607 A | * | 9/2000 | Jung | 360/53 |
| 6,831,800 B2 | * | 12/2004 | Ranmuthu | 360/68 |
| 2003/0076613 A1 | * | 4/2003 | Ngo et al. | 360/68 |

FOREIGN PATENT DOCUMENTS

| NL | WO 02/11129 A1 | * | 2/2002 |
|---|---|---|---|
| WO | WO 02/01129 A1 | * | 2/2002 |

* cited by examiner

*Primary Examiner*—Wayne Young
*Assistant Examiner*—Adam R. Giesy
(74) *Attorney, Agent, or Firm*—Warren L. Franz; Wade J. Brady, III; Frederick J. Telecky, Jr.

(57) ABSTRACT

A circuit (40) for use in a mass data storage device (10) has first (44) second (46) current driver circuits for providing write currents to the data transducer (18). The first and second current levels are different, the second current level being lower than the first. The first current driver circuit (44) may be used to apply currents representing user data to the data transducer (18) and the second current driver circuit (46) may be used to apply currents representing servo information to the data transducer (18). In addition, the first (44) and second (46) current drivers circuits may be operated at different frequencies. The first (44) and second (46) current driver circuits additionally may share at least some circuit components (70, 72, 74-75, 64-65), and may operate at different write speeds.

22 Claims, 2 Drawing Sheets

LOW POWER SERVO MODE WRITE DRIVER

BACKGROUND OF INVENTION

1. Field of Invention

This invention relates to improvements in mass data storage devices, and, more particularly, to improvements in circuits used to write user and servo data to data storage media, such as spinning magnetic disks, or the like, with a thin film data transducer, or head in mass data storage devices.

2. Relevant Background

Mass data storage devices of the type to which the invention pertains include hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Applications for hard disk drives are still being discovered.

Typically in a hard disk drive, a stack of rotating storage disks is provided. The disks are generally formed of a suitable substrate material, such as metal or glass, onto which a thin film magnetic storage medium has been vacuum sputter deposited. The disks are generally secured to a disk spindle that rotates the disk.

Servo synchronization data is imprinted onto the disks, typically by a servo writer during the manufacturing process of the mass data storage device in which the disks are included, by altering the magnetic domains on the disk in each sector of each track as it is being defined on the disks. Such servo imprints are used for identifying individual tracks, sectors, data beginning and ending locations, head alignment along the track, and so forth. The servo sectors are written by the disk drive manufacturer by a device known as a track writer, and are generally not re-written. The process of writing the servo sectors is known as hard formatting, as opposed to soft formatting, which is performed by the end user for different purposes.

Read/write transducers, or heads, are a part of the mass data storage device, and are carried by pivotally mounted arms extending over the surface of the disks to move the heads radially inwardly and outwardly over selected radial distances of the disks. The radial position of the write head arm is controlled in a known manner by a "voice coil" that receives positioning signals from a voice coil driver circuit.

As the heads fly over the disks along the paths of the track with which they are currently aligned, electrical currents are passed through the heads at strategic times, so that the heads will produce magnetic flux signals that are recorded onto or in the magnetic media of the spinning disk.

So-called magneto-resistive (MR) heads are becoming increasingly popular, and may be used in environments having very high disk drive densities with low power requirements. Despite the reduced power requirements of MR heads, one of the problems facing mass data storage device designers is that as write speeds demanded of the heads and their supporting electronics increase, so does the current required to develop the magnetic fluxes necessary to operate the writing functions of the heads. In the past, write drivers operated at 1 Gb/s during normal operation and <100 Mb/s during servo operation. Little care was taken to lower the power of the writer while running at lower servo data rates because the power was naturally reduced in those architectures at lower data rates. For example, the previous writers consumed about 2 watts at 1 Gb/s but consumed 0.5 watts at 100 Mb/s. Newer writers which are designed for 1.6 Gb/s have higher DC current (current that is used with no switching). Thus, newer writers consume 2 watts at 1.6 Gb/s and they consume 1.2 Watts at 100 Mb/s. Thus, there is a need for a smarter design which uses less power during servo operation.

As described above, servo write operations occurs only during drive manufacturing, and is a well controlled environment; however, even with careful selection of operating conditions, a 1.6 Gb/s design writer will consume 2 watts, and at data rates below 100 Mb/s will consume 1.2 watts. This results in the tolerable temperature of the integrated circuit on which the drive circuitry is constructed being exceeded, and needs excessively large power busses to not exceed electromigration rules.

What is needed therefore, is a write driver that can be controlled to achieve the needed servo and data write functions without exceeding the current and power limitations of the writer circuitry.

SUMMARY OF INVENTION

The present invention achieves technical and simplicity advantages as a low power servo write driver for a thin film transducer. The present invention is a general method of combining a separate low power servo writer in parallel with the main high-speed writer that operates at less power.

Thus, it is an advantage that the power servo write driver of the invention has low power requirements, compared to prior servo mode write drivers.

It is another advantage of the invention that a single circuit can be used to provide both the main user data and the servo information write drivers.

According to a broad aspect of the invention, a circuit is presented for use in a mass data storage device that includes a data transducer for creating a magnetic field in response to a current applied thereto. The circuit includes a first driver circuit for providing a current to the data transducer at a first current level, and a second current driver circuit for providing a current to the data transducer at a second current level. The second current driver circuit is connected in parallel with the first driver circuit, and may be operated at a current level that is lower than the first current level. The first and second current driver circuits additionally may share at least some circuit components and may operate at different write speeds and/or different supply voltages.

According to another broad aspect of the invention, a method is presented for writing user data and servo information to a rotating disk of a mass data storage device having at least one thin-film transducer for writing data and information to the disk. The method includes operating a first current driver circuit to provide write signals to a write head of the mass data storage device at a first current level and operating a second current driver circuit in parallel with the first write current driver circuit to provide write signals to the write head of the mass data storage device at a second current level. The second current level may be lower than the first current level. According to the method, the first current driver circuit may be operated to supply user data write currents to the thin-film transducer, and the second current driver circuit may be operated to supply servo information write currents to the thin-film transducer. The first and second current driver circuits may be operated at different write speeds.

According to yet another broad aspect of the invention, a mass data storage device is presented. The mass data storage device has a rotating magnetic media disk and a thin-film transducer for at least writing information to the rotating magnetic media disk. A first current driver circuit provides write currents to the thin-film transducer at a first current level and a second current driver circuit provides write currents to the thin-film transducer at a second current level. The second current driver circuit may be connected in parallel with the first current driver circuit, and the second current level may be lower than the first current level. In a preferred embodiment, the first and second current driver circuits share at least some circuit components and operate at different write speeds.

DETAILED DESCRIPTION

Figure 1:
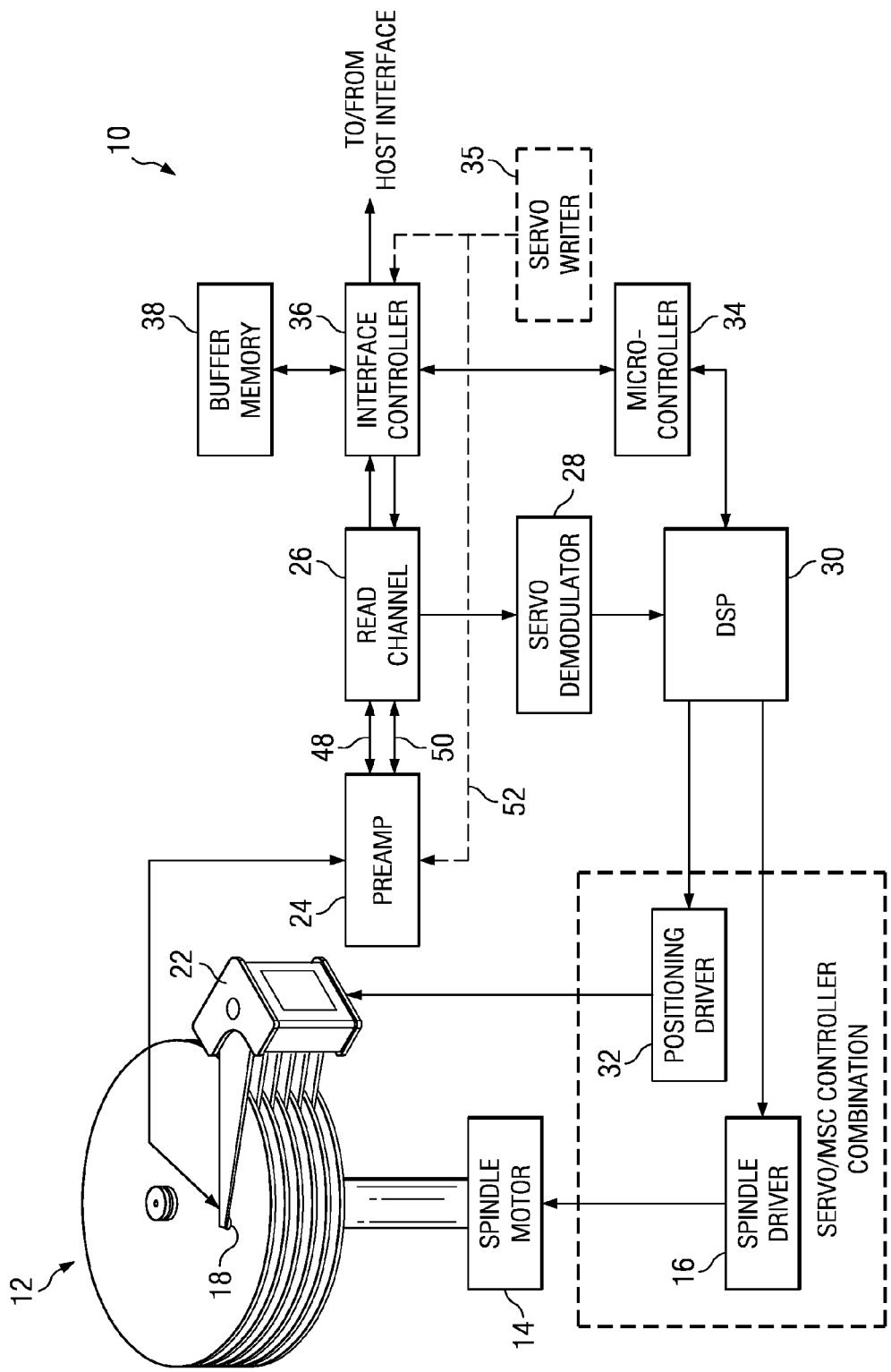
FIG. 1 is a block diagram of a generic disk drive system, illustrating the general environment in which the invention may be practiced.

With reference first to FIG. 1, a block diagram of a generic disk drive system 10 is shown, illustrating a general environment in which the invention may be practiced. The system 10 includes a stack of magnetic media disks 12 that are rotated by a spindle motor 14 and spindle driver circuit 16. A plurality of data transducers, or heads, 18 are locatable along selectable radial tracks (not ordinarily visible) of respective ones of the disks 12 by a voice coil motor (VCM) 22. As explained above, the radial tracks may contain magnetic states that contain information about the tracks, such as track identification data, location information, synchronization data, as well as user data, and so forth.

The heads 18 typically are used both to record user data to and read user data back from the disks, as well as to detect signals that identify the tracks and sectors at which data is written, and to detect servo bursts that enable the heads to be properly laterally aligned with the tracks of the disks. The heads 18 also are used to initially write servo data to the disks 12.

Analog electrical signals that are generated by the heads in response to the magnetic signals recorded on the disks are preamplified by a preamplifier 24 for delivery to read channel circuitry 26. In addition, servo signals are detected and demodulated by one or more servo demodulator circuits 28 and processed by a digital signal processor (DSP) 30 to control the position of the heads 18 via the positioning driver circuit 32. The servo data that is read and processed may be analog data that is interpreted by the DSP 30 for positioning the heads.

A microcontroller 34 is typically provided to control the DSP 30. An interface controller 36 is also provided to enable data to be passed to and from a host interface (not shown) in known manner. A data buffer memory 38 may be provided, if desired, to buffer data being written to and read from the disks 12.

As will become apparent below, according to the invention, when servo information is to be written to the disks 12 by an external servo writer 35, shown in dashed lines, the write amplifiers within the preamplifier block 24 are configured to allow a low speed, low power mode of operation, as described below in conjunction with FIG. 2.

Figure 2:
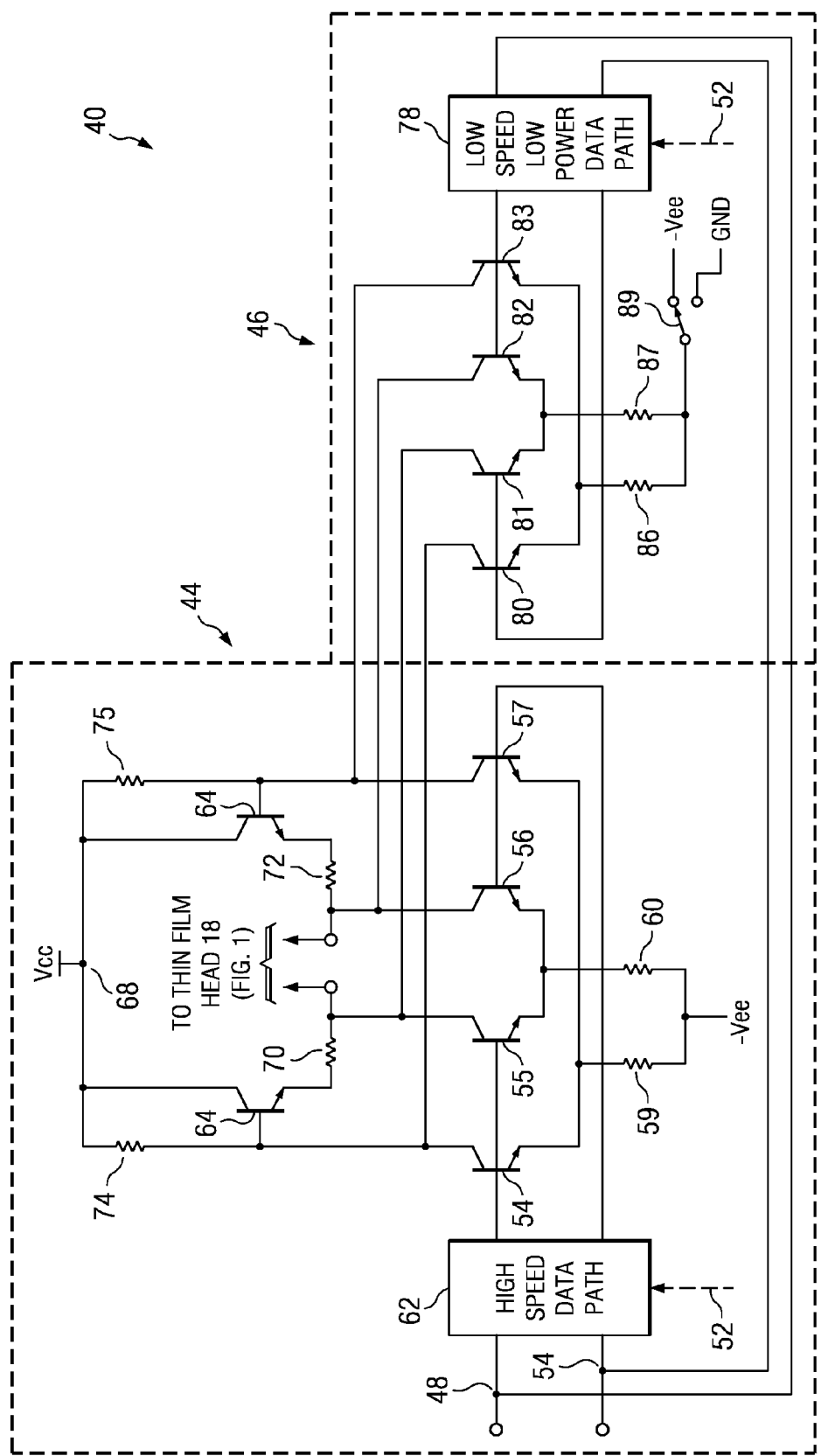
FIG. 2 is an electrical schematic diagram of a write driver circuit, constructed in accordance with a preferred embodiment of the invention, including both high-speed data path for writing user data to a disk of a mass data storage device, and a low-speed, low power data path for writing servo information to the disk.

Thus, with reference now additionally to FIG. 2, a circuit 40 is shown to provide both user write data and servo write data signals to the thin-film head 18 (see FIG. 1). The circuit 40 includes two main sections, a high-speed data writing section 44 and a low-speed, low power servo writing section 46. The high-speed data writing section 44 and the low-speed, low power servo writing section 46 are essentially connected in parallel. Therefore, one or the other section may be selectively actuated, for example, by signals on lines 52 from the servo writer, or other control circuit (not shown), to write data from the input terminals 48 and 50 to the head 18, for ultimate transfer to the disks 12.

The high-speed circuit 44 includes NPN transistors 54-57 and resistors 59-60. The transistors 54-57 are driven in respective pairs to control the current through the head 18 to flow in one direction or the other under the control of the high-speed data path circuitry 62 in known manner. Additionally, transistors 54 and 57 respectively control transistors 64 and 65, connected between the supply line 68 and resistors 70 and 72 in an "upper portion" of the circuit 44. Resistor 59 is connected from the emitters of transistors 54 and 57 to Vee, and resistors 74 and 75 are connected from the collectors of transistors 54 and 57 to the supply rail 68. The high-speed data path circuitry 62 receives input signals on data lines 48 and 50.

Thus, in normal data writing operation, depending upon the control signals applied by the high-speed data path circuitry 62 to the selected transistors 54-57, a current path is set up in one of two directions. Current flows either from the supply rail 68, through transistor 64, resistor 70, head 18, transistor 56, and resistor 60 to Vee, or from the supply rail 68, through transistor 65, resistor 72, head 18, transistor 55, and resistor 60 to Vee.

On the other hand, when servo data is to be written to the disks of the drive, the external servo writer 35 operates to enable the low-speed low power data path 78, and disable the high-speed data path 62, via control signals on lines 52. The low-speed section 46 shares the "upper portion" of the high-speed section 44 described above. More particularly, the transistors 64-65, and the resistors 70, 72, and 74-75 are shared between both the high- and low-speed drivers.

In addition, the low speed driver section 46 includes four NPN transistors 80-83 having collectors connected in parallel with the collectors of transistors 54-57. Resistors 86 and 87 respectively connect the emitters of transistors 80 and 83 and the emitters of transistors 81 and 82 to a switch 89, which connects them selectively either to ground or Vee. The switch 89 is optional, and may not be necessary in some applications; however, the use of the switch 89 enables the servo write power to be further reduced by providing a capability of operating with respect to a ground reference potential instead of a Vee reference potential. The low-speed, low power data path circuitry 78 receives input signals on data lines 48 and 50, which are shared with the high-speed data path circuitry 62 described above.

Thus, in servo information writing mode of operation, depending upon the control signals applied by the low-speed, low power data path circuitry 78 to the selected transistors 80-83, a current path is set up in one of two directions. Current flows either from the supply rail 68, through transistor 64, resistor 70, head 18, transistor 82, and resistor 87 to ground or Vee, or from the supply rail 68, through transistor 65, resistor 72, head 18 transistor 81, and resistor 87 to ground and Vee.

The write data may be externally supplied (supply not shown), in differential emitter-coupled-logic (ECL) format or Pseudo Emitter Coupled Logic (PECL) on input lines 48 and 50. The differential ECL form is a digital signal and is supplied to both the high- and low-speed data path circuitry 62 and 78, as described above. During normal write mode, the high-speed data path circuitry 62 is enabled and the "lower write driver" circuitry (transistors 54-57 and resistors 59-60) is active. Simultaneously, the low-speed, low power data path circuitry 78 is disabled, and, if used, the switch 89 is connected to the −Vee position.

On the other hand, during servo write mode of operation, many of the write heads 18 (see FIG. 1) are active to write data simultaneously. In this mode, therefore, a low power is desired. In this mode, the high-speed data path circuitry 62 is disabled, and the low-speed, low power data path circuitry 78 is enabled. The "servo lower write driver" circuitry (transistors 80-83 and resistors 86-87) is active and, as mentioned, the shared "upper driver" circuitry (transistors 64-65 and resistors 70, 72, and 74-75) is used. The "lower write driver" associated with the high speed data path circuitry 62 is disabled. The switch 89, if used, may be switched to the GND position for additional power savings.

It should be noted that the sharing of the "upper write driver" circuitry (transistors 64-65 and resistors 70, 72, and 74-75) is done in current mode. Therefore, switches are not required in the high-speed data path. As a result, the normal write driver speed in servo information write mode is not compromised. However, the extra parasitic capacitance of the servo "lower driver circuitry" does add into the overall capacitance in normal data write mode of operation. It is believed, nonetheless, that these parasitic effects are negligible in most applications if the device sizes are properly chosen.

It should also be noted that although a single circuit 40 is shown in FIG. 3, in an actual implementation in a mass data storage device, a circuit correspondingly constructed to the circuit 40 may be provided for each head channel employed. Thus, for example, if eight heads are used, the circuit 40 would be replicated eight times with each circuit 40 being used with each respective head.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A circuit for use in a mass data storage device, comprising:
 a data transducer for creating a magnetic field in response to a current applied thereto;
 a first driver circuit for providing a current to said data transducer at a first current level; and
 a second current driver circuit for providing a current to said data transducer at a second current level;
 wherein said first and second current driver circuits share at least some circuit components; and
 wherein said first and second current driver circuits operate at different write speeds.

2. A method for writing user data and servo information to a rotating disk of a mass data storage device having at least one thin-film transducer for writing data and information to said disk, comprising:
 operating a first current driver circuit to provide write signals to a write head of said mass data storage device at a first current level;
 operating a second current driver circuit in parallel with said first write current driver circuit to provide write signals to said write head of said mass data storage device at a second current level;
 wherein said first and second current driver circuits share at least some circuit components;
 wherein said operating a first current driver circuit comprises operating said first current driver circuit to supply user data write currents to said thin-film transducer; and
 wherein said operating a second current driver circuit comprises operating said second current driver circuit to supply servo information write currents to said thin-film transducer.

3. A method for writing user data and servo information to a rotating disk of a mass data storage device having at least one thin-film transducer for writing data and information to said disk, comprising:
 operating a first current driver circuit to provide write signals to a write head of said mass data storage device at a first current level;
 operating a second current driver circuit in parallel with said first write current driver circuit to provide write signals to said write head of said mass data storage device at a second current level;
 wherein said first and second current driver circuits share at least some circuit components; and
 wherein said operating said first and second current driver circuits comprises operating said first and second current driver circuits at different write speeds.

4. A mass data storage device, comprising:
 a rotating magnetic media disk;
 a thin-film transducer for at least writing information to said rotating magnetic media disk;
 a first current driver circuit for providing write currents to said thin-film transducer at a first current level; and
 a second current driver circuit for providing write currents to said thin-film transducer at a second current level;
 wherein said first and second current driver circuits share at least some circuit components; and
 wherein said first and second current driver circuits operate at different write speeds.

5. A circuit for use in writing user data and servo information to data storage media, such as a rotating magnetic disk or the like, of a mass data storage device, comprising:
 a data transducer for creating a magnetic field in response to a current applied thereto;
 a first driver circuit for providing a current to said data transducer at a first current level for writing said user data to said disk at a first power level and write speed; and
 a second current driver circuit connected in parallel with said first driver circuit, for providing a current to said data transducer at a second current level for writing said servo information to said disk at a second power level and write speed lower than said first power level and write speed;
 wherein said first and second current driver circuits share at least some circuit components.

6. The circuit of claim 5, wherein said second current level is lower than said first current level.

7. The circuit of claim 5, wherein said first and second current driver circuits operate from different reference voltages.

8. The circuit of claim 5, further comprising a switch for selectively connecting said second current driver circuit to one of two reference voltages.

9. The circuit of claim 5, wherein said first driver circuit comprises first transistors driven in respective pairs to control the direction of current provided to said data transducer under control of high-speed data path circuitry;
wherein said second current driver circuit comprises second transistors driven in respective pairs to control the direction of current provided to said data transducer under control of low-speed data path circuitry; and
wherein said shared at least some circuit components comprise resistors coupled to said first and second transistors and to said data transducer, and third transistors coupled between voltage supply terminals and said resistors.

10. The circuit of claim 9, wherein said first transistors are NPN transistors, and said second transistors are NPN transistors having collectors connected in parallel with collectors of said first transistors.

11. A method for writing user data and servo information to a rotating disk of a mass data storage device having at least one thin-film transducer for writing data and information to said disk, comprising:
operating a first current driver circuit to provide write signals to a write head of said mass data storage device at a first current level for writing said user data to said disk at a first power level and write speed;
operating a second current driver circuit in parallel with said first write current driver circuit to provide write signals to said write head of said mass data storage device at a second current level for writing said servo information to said disk at a second power level and write speed lower than said first power level and write speed;
wherein said first and second current driver circuits share at least some circuit components.

12. The method of claim 11, wherein said operating said first and second current driver circuit comprises operating said second current driver circuit at a current level that is lower than said first current level.

13. The method of claim 11, wherein said operating said first and second current driver circuits comprises operating said first and second current driver circuits from different reference voltages.

14. The method of claim 11, further comprising accepting external signals to select between said first and second current driver circuits for operation.

15. The method of claim 11, wherein said first driver circuit comprises first transistors driven in respective pairs to control the direction of current provided to said transducer under control of high-speed data path circuitry;
wherein said second current driver circuit comprises second transistors driven in respective pairs to control the direction of current provided to said transducer under control of low-speed data path circuitry; and
wherein said shared at least some circuit components comprise resistors coupled to said first and second transistors and to said transducer, and third transistors coupled between voltage supply terminals and said resistors.

16. The method of claim 15, wherein said first transistors are NPN transistors, and said second transistors are NPN transistors having collectors connected in parallel with collectors of said first transistors.

17. A mass data storage device, comprising:
a rotating magnetic media disk;
a thin-film transducer for at least writing information to said rotating magnetic media disk;
a first current driver circuit for providing write currents to said thin-film transducer at a first current level for writing said user data to said disk at a first power level and write speed; and
a second current driver circuit connected in parallel with said first driver circuit, for providing write currents to said thin-film transducer at a second current level for writing said servo information to said disk at a second power level and write speed lower than said first power level and write speed;
wherein said first and second current driver circuits share at least some circuit components.

18. The mass data storage device of claim 17, wherein said second current level is lower than said first current level.

19. The mass data storage device of claim 17, wherein said first and second current driver circuits operate from different reference voltages.

20. The mass data storage device of claim 17, further comprising a switch for selectively connecting said second current driver circuit to one of two reference voltages.

21. The mass data storage device of claim 17, wherein said first driver circuit comprises first transistors driven in respective pairs to control the direction of current provided to said data transducer under control of high-speed data path circuitry;
wherein said second current driver circuit comprises second transistors driven in respective pairs to control the direction of current provided to said data transducer under control of low-speed data path circuitry; and
wherein said shared at least some circuit components comprise resistors coupled to said first and second transistors and to said data transducer, and third transistors coupled between voltage supply terminals and said resistors.

22. The mass data storage device of claim 21, wherein said first transistors are NPN transistors, and said second transistors are NPN transistors having collectors connected in parallel with collectors of said first transistors.

* * * * *